United States Patent
Thomas et al.

(10) Patent No.: US 10,731,726 B2
(45) Date of Patent: *Aug. 4, 2020

(54) ELECTRICALLY CONDUCTIVE POWER TRANSMISSION BELT

(71) Applicant: GATES CORPORATION, Denver, CO (US)

(72) Inventors: Christopher M. Thomas, Elizabethtown, KY (US); Joseph R. Duke, Jr., Elizabethtown, KY (US); Karla J. Bier, Columbia, MO (US); Cathy Peake Wilson, Elizabethtown, KY (US)

(73) Assignee: Gates Corporation, Denver, CO (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/681,100

(22) Filed: Aug. 18, 2017

(65) Prior Publication Data
US 2017/0343077 A1 Nov. 30, 2017

Related U.S. Application Data

(63) Continuation of application No. 14/247,025, filed on Apr. 7, 2014, now Pat. No. 9,829,066.

(51) Int. Cl.
*F16G 1/10* (2006.01)
*F16G 1/28* (2006.01)
(Continued)

(52) U.S. Cl.
CPC ............... *F16G 1/10* (2013.01); *B29D 29/08* (2013.01); *F16G 1/28* (2013.01); *F16G 5/08* (2013.01);
(Continued)

(58) Field of Classification Search
CPC ...... F16G 1/00; F16G 1/10; F16G 1/12; F16G 1/28; F16G 5/00; F16G 5/08; F16G 5/10
See application file for complete search history.

(56) References Cited

U.S. PATENT DOCUMENTS

| | | |
|---|---|---|
| 3,894,900 A | 7/1975 | Redmond, Jr. |
| 3,964,328 A | 6/1976 | Redmond, Jr. |

(Continued)

FOREIGN PATENT DOCUMENTS

| | | |
|---|---|---|
| CN | 102099597 A | 6/2011 |
| JP | 61-004050 U | 1/1986 |

OTHER PUBLICATIONS

Intellectual Property India, The Patent Office, Examination Report, Application No. 201617032933, dated Jul. 23, 2019.
(Continued)

*Primary Examiner* — Minh Truong
(74) *Attorney, Agent, or Firm* — Paul N. Dunlap, Esq.

(57) ABSTRACT

A belt made up of an elastomeric belt body, an electrically conductive tensile cord such as carbon fiber cord in a cord layer reinforcing the belt body, an outer layer of electrically conductive thermoplastic material such as polypropylene film, and an electrically conductive fabric layer residing between the tensile cord layer and the outer layer and providing electrical continuity between the outer layer and the tensile cord. An electrically conductive thread may be woven in the fabric and may present at both surfaces of the fabric and contact both the outer layer and the tensile cord to provide the electrical continuity there between.

23 Claims, 4 Drawing Sheets

(51) Int. Cl.
*H05F 3/00* (2006.01)
*B29D 29/08* (2006.01)
*F16G 5/08* (2006.01)
*F16G 5/20* (2006.01)
*B29K 75/00* (2006.01)
*B29K 105/10* (2006.01)
*B29K 105/08* (2006.01)

(52) U.S. Cl.
CPC ............... *F16G 5/20* (2013.01); *H05F 3/00* (2013.01); *B29K 2075/00* (2013.01); *B29K 2105/0809* (2013.01); *B29K 2105/10* (2013.01); *B29K 2995/0005* (2013.01)

(56) References Cited

U.S. PATENT DOCUMENTS

| | | | |
|---|---|---|---|
| 4,296,855 A | 10/1981 | Blalock | |
| 4,690,664 A * | 9/1987 | Wetzel | B29D 29/08 |
| | | | 474/205 |
| 4,734,087 A | 3/1988 | Takano et al. | |
| 6,443,866 B1 | 9/2002 | Billups | |
| 6,461,264 B1 | 10/2002 | Lofgren | |
| 6,616,558 B2 | 9/2003 | South | |
| 6,770,004 B1 * | 8/2004 | Lofgren | F16G 1/00 |
| | | | 474/264 |
| 6,824,485 B2 | 11/2004 | Edwards et al. | |
| 7,235,028 B2 * | 6/2007 | Martin | B29D 29/08 |
| | | | 474/264 |
| 8,192,316 B2 * | 6/2012 | Marc | B65G 15/34 |
| | | | 442/229 |
| 9,829,066 B2 * | 11/2017 | Thomas | F16G 1/10 |
| 2008/0132370 A1 * | 6/2008 | Goettsch | F16G 1/28 |
| | | | 474/268 |
| 2014/0296011 A1 * | 10/2014 | Yoshida | F16G 5/08 |
| | | | 474/261 |

OTHER PUBLICATIONS

Federal Institute of Industrial Property (FIIP), Search Report, Russian application No. 2016143193, Date of completion of the search: Sep. 21, 2017.

* cited by examiner

ELECTRICALLY CONDUCTIVE POWER TRANSMISSION BELT

BACKGROUND OF THE INVENTION

1. Field of the Invention

This invention relates generally to electrically conductive power transmission belts, more particularly to static conductive timing belts, and specifically to a belt with conductive film, fabric, and tensile cord.

2. Description of the Prior Art

Drive belts are used for power transmission, motion control, transport applications, as well as for timing applications. Power transmission belts may be in the form of flat belts, toothed belts, V-belts, multi-v ribbed belts or other special profiles. They typically are electrically insulating and/or contain electrically insulating materials. It is sometimes desirable that the belts not retain electrostatic charges, i.e., that the belts have anti-static properties.

Anti-static properties may be defined in various standards and generally include one or more of the following characteristics: surface resistance lower than $10^8$ ohms; volume resistance lower than $10^9$ ohms; and ground bleeder resistance lower than $10^6$ ohms/meter. Standards such as BS PD CLC/TR 50404:2003, DIN EN 13463-1, and IEC 60079-0 provide information on the avoidance of hazards due to static electricity. ASTM D-257 provides a resistance test for various rubber articles. Particularly applicable to timing belts is the standard, ISO 9563:1990(E), which states that the resistance in ohms of new antistatic belts should not exceed $6 \times 10^5$ L/w when measured according to that standard. Herein, a belt that meets the ISO 9563 standard will be called "conductive" whether the belt is new or used. In use, a belt can rapidly lose conductivity from wear or breakdown of the conductive material component.

U.S. Pat. No. 8,192,316 discloses an elastomeric power transmission belt with an anti-static, wear-resistant, covering fabric which includes a nonconductive natural or synthetic polymeric fiber and a conductive fiber. The conductive fiber is a synthetic polymeric fiber with a conductive metallic coating such as silver.

JP 1018410A discloses use of a conductive yarn to thwart counterfeiters of toothed belts.

U.S. Pat. No. 6,770,004 discloses a timing belt with an electrically conductive thermoplastic layer on the surface which contacts a pulley. The disclosure claims the conductivity of the belt is maintained over an extended use life, and provides two examples based on a flex tester. The performance in more demanding loaded testing was not reported.

U.S. Pat. No. 4,767,389 discloses a flat, plastic-covered-textile belt with anti-static properties arising from either an electrically conductive filament in the threads of the textile supporting element or an electrically conductive layer between the textile support and plastic covering. The conductive filament may be metal or carbon fiber. The conductive layer may be soot-containing plastic. The plastic covering may be thermoplastic polyurethane. U.S. Pat. No. 7,328,785 teaches a conductive toothed pulley made from a conductive thermoplastic. The thermoplastic may be conductive from the use of conductive microfibers, graphite or carbon black mixed therein.

U.S. Pat. No. 6,228,448 teaches use of an electrically conductive elastomeric surface ply which is preferably doped with a sufficient amount of carbon black or other conductive additives to give the outer ply or entire endless belt a surface resistivity of less than about $10^{14}$ ohm/square.

U.S. Pat. No. 5,417,619 teaches a covering canvas impregnated with an anti-static rubber composition based on conductive carbon black. An unwanted side effect of such coatings is a decrease in the abrasion resistance of the fabric resulting in rapid loss of the anti-static effect during use. The resulting abraded particles can be detrimental to nearby electronic or electrical components or systems. U.S. Pat. No. 5,351,530 makes use of such loss of conductivity to indicate the state of wear of a conductive-rubber-coated fabric.

What is needed is a conductive belt which retains conductivity over an extended use life on demanding loaded applications.

SUMMARY

The present invention is directed to systems and methods which provide electrically conductive power transmission belts which maintain conductivity over the life of the belt on loaded applications.

The invention is directed to a belt made up of an elastomeric belt body, an electrically conductive tensile cord such as carbon fiber cord in a cord layer reinforcing the belt body, an outer layer of electrically conductive thermoplastic material such as polypropylene film, and an electrically conductive fabric layer residing between the tensile cord layer and the outer layer and providing electrical continuity between the outer layer and the tensile cord. An electrically conductive thread or filament may be included in the fabric and may present at both surfaces of the fabric and contact both the outer layer and the tensile cord to provide the electrical continuity there between. The conductive thread or filament may be woven, stitched, needle punched, knit, or the like into the fabric. The conductive thread may include conductive metal-coated fiber, such as silver on polyamide. The conductive thread may be bundled with non-conductive fibers and woven into the fabric with non-conductive threads at a predetermined spacing or weight fraction. The predetermined amount of conductive thread may be a spacing of 1 mm or more, or in the range from 1 to 10 mm, or from about 3 to about 5 mm, or may be a weight percent of at least 1%, or 1% to 9% based on the total fabric weight. The conductive thread or threads may be in the warp or weft direction of the fabric or both directions.

In another embodiment the conductive fabric may be a fabric with a conductive impregnating coating.

The invention is also directed to a method of making a conductive belt in which a conductive thermoplastic film, a conductive fabric and a conductive tensile cord are applied to a belt mold so that the three are in electrical contact.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 7 is a graphical representation of belt electrical resistance versus hours on test percent of belt life for a number of Example and Comparative belts tested on the drive layout of FIG. 5; and.

DETAILED DESCRIPTION

Figure 1:
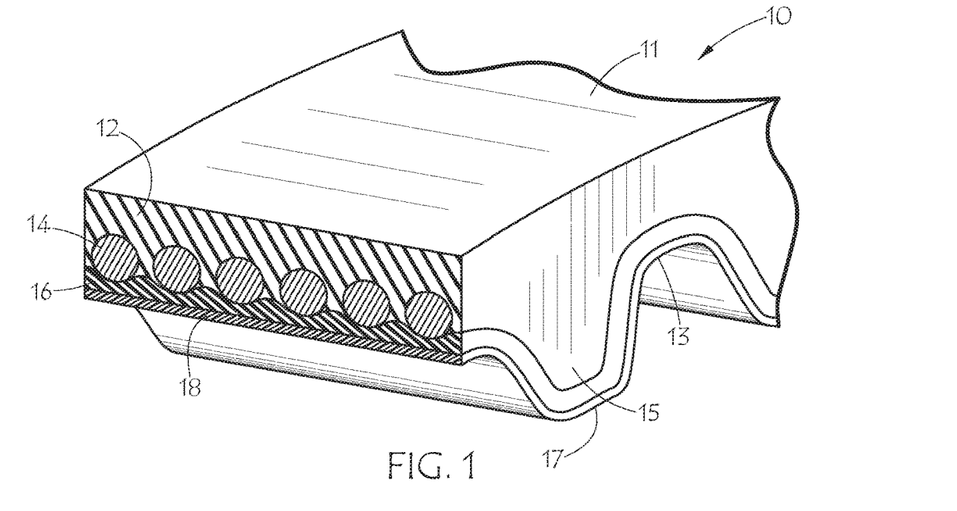
FIG. 1 is a partially fragmented perspective view of an embodiment of the invention.

FIG. 1 shows an embodiment of the inventive conductive belt in the form of synchronous belt 10 with flat back side 11 and toothed side 17, which includes teeth 15 alternating with lands 13. The internal construction of synchronous belt 10 includes elastomeric body 12, tensile cord 14 embedded therein, fabric layer 16, and outer layer 18. Tensile cord 14 includes an electrically conductive material such as carbon fiber or metal wire. The cord may be a hybrid of the electrically conductive material with other non-conductive cord materials such as glass, aramid, PBO, or the like, provided the conductive material presents at the surface of the cord at least in a plurality of places. The fabric layer 16 is likewise conductive. The outer layer 18 is also conductive and may be a conductive thermoplastic film or a conductive thermoset coating which provides the belt with a surface conductivity suitable for at least dissipating static charges. The fabric layer 16 provides electrical continuity between the outer layer and the conductive tensile cord. The resulting conductive belt is not only conductive at its surface, nor only conductive via its cord, but is conductive through both cord and surface and there between through the fabric layer.

It is common to call the materials covering the elastomeric teeth of a synchronous belt the "jacket." The conductive jacket of belt 10 thus includes the combination of the conductive outer layer 18 and the conductive fabric layer 16. Thus, there is electrical continuity between the conductive jacket and the conductive tensile cord.

Figure 2:
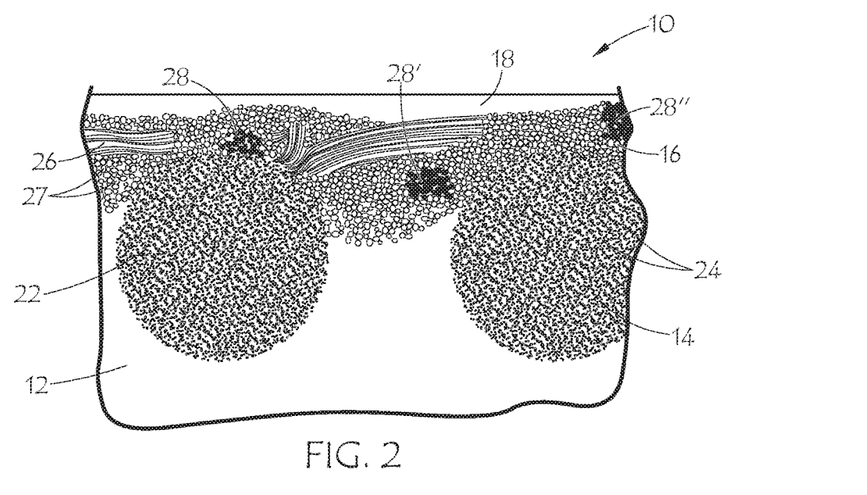
FIG. 2 is an enlarged partially fragmented section of a portion of the embodiment of FIG. 1.

FIG. 2 illustrates in more detail some of the features of belt 10 of FIG. 1. In FIG. 2, tensile cord 14 is seen to be a bundle of individual fibers 24 with interstices 22 there between. The elastomeric material of body 12 may penetrate into interstices 22 to some degree or completely. Alternately, some or all of the interstices may be impregnated with a cord treatment which may be different from the elastomeric material of the belt body. Fabric 16 includes warp threads 26 and weft threads 27. As shown the warp runs generally across the width of the belt or transversely, while the weft threads run generally along the length of the belt or longitudinally. Depending on the fabric weave, the warp may be the longitudinal thread and the weft the transverse thread, or the fabric could be laid at an angle on the belt. Weft threads 27 include conductive fibers 28, 28' and 28". The conductive fibers 28 illustrate a point of contact with the tensile cord 14. Conductive fibers 28' illustrate a point of no contact with the tensile cord 14 or outer layer 18. Conductive fibers 28" illustrates a point of contact with outer layer 18. In a given belt 10, there will be multiple such contacts between the conductive fibers 28 of fabric 16 and the conductive outer layer 18 and the tensile cord 14. As a result, the conductivity of the belt may be established through multiple paths through the cord, fabric and outer layer.

The inventive belt exhibits much superior conductivity over prior belts having only a conductive surface layer, or only conductive cord, or only conductive fabric. Such prior belts rapidly loose conductivity as the conductive element is damaged or worn. In fact, it has been proposed to use such an otherwise undesirable loss of conductivity as a method of determining the state of wear or state of degradation of the belt. However, in many applications requiring conductivity, it would be more desirable for the belt to maintain conductivity over the entire life of the belt. The present invention achieves this goal. Moreover, different applications may produce different types of belt damage leading to the end of the useful life of the belt, i.e., different "failure modes." A synchronous belt drive with low tooth loads but small diameter pulleys would likely experience tensile cord damage before the outer layer or fabric becomes very worn, i.e., a tensile cord failure mode. If that belt relied on conductive tensile cord for conductivity, it would gradually lose conductivity during its life. On the other hand, a high tooth load drive with moderate diameter pulleys would likely exhibit a jacket wear failure mode, or a tooth shear failure mode. If that belt relied on surface conductivity or fabric conductivity, it would likely fail to remain conductive as soon as the conductive outer layer or conductive fabric (as the case may be) was worn through somewhere.

Figure 3:
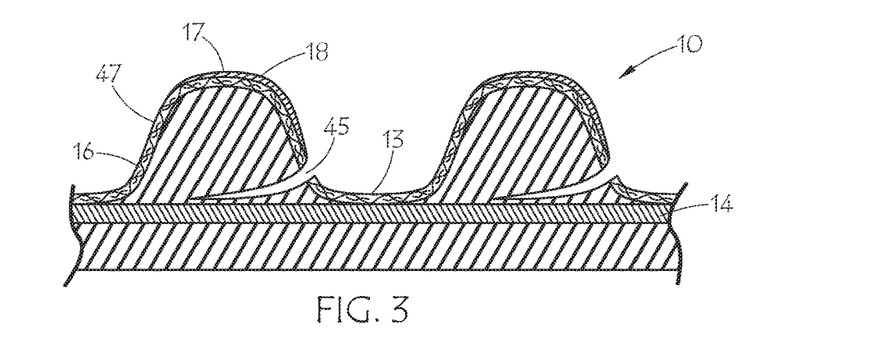
FIG. 3 is a partially fragmented side view of the belt of FIG. 1 after severe use.

FIG. 3 shows an example of the belt 10 of FIG. 1 in a severely worn state at or near the end of its useful life. In FIG. 3, conductive outer layer 18 only remains intact on the tips of teeth 17. The outer layer is worn away on tooth flanks 47 and in the lands 13. Moreover, conductive fabric 16 is broken through by cracks 45 at the roots of the teeth. Nevertheless, inventive test belts in such a worn condition are still conductive via the conductive paths provided from whatever is left as the outer surface through remaining fabric 16 to tensile cord 14, at least in the land regions 13.

Figure 4:
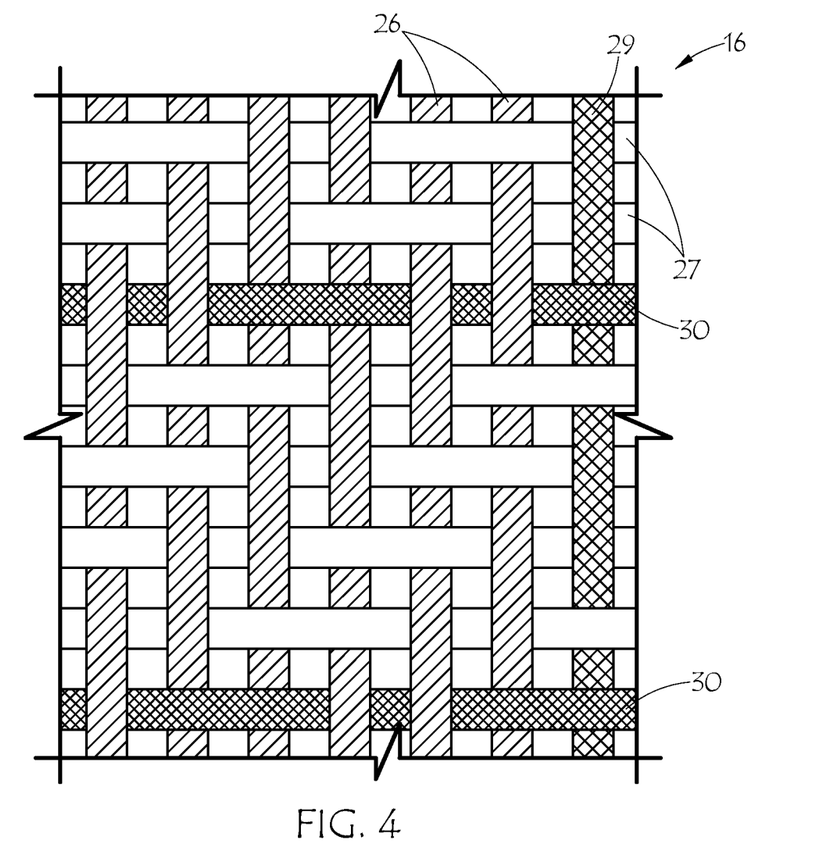
FIG. 4 is a schematic representation of a conductive fabric.

The anti-static, wear-resistant fabric may be woven of weft and warp yarns or threads, knitted, or non-woven. Any suitable weave or knit may be used for fabric 16, such as square weave, twill weave, or the like. FIG. 4 illustrates one possible configuration for fabric 16, namely a 2×2 twill weave with warp 26 having a conductive thread 29 every seventh warp or more, and weft 27 having a conductive thread 30 every sixth weft thread. The conductive threads may be woven into the weft alone, the warp alone, or both warp and weft. Alternately, the conductive thread or filament may be stitched, needle punched, knit, or the like into the fabric. The spacing of the conductive thread(s) may be predetermined to provide the desired conductivity. The predetermined spacing may be, for example, in the range from 1 to 10 mm, preferably from about 3 to about 5 mm. The conductive threads may be monofilaments of conductive fiber, bundles of filaments of conductive fibers, mixed bundles of conductive monofilaments or fibers with non-conductive fibers or filaments. The conductive threads may be constructed in any suitable way, e.g., twisted, cabled, wrapped, textured, and the like. Preferably, the conductive material in the conductive thread presents at the surface of the thread and therefore at the surface of the resulting fabric in order to establish electrical continuity with the other components of the belt. For example, the conductive thread could be core-insert construction with a non-conductive core wrapped with a conductive filament or thread. The non-conductive polymeric fibers, as well as the base fibers of metal-coated conductive fibers, may be any desired natural or synthetic fiber, such as polyester, nylon or polyamide ("PA"), acrylic, cotton, rayon, aramid, or the like. The fibers may be textured, twisted, blended, or the like. Hybrid, composite, or blended threads may be random fiber mixtures, twisted or cabled yarns or threads of various types, or structured such as wrapped or core-sheath yarns. Preferred nonconductive fibers and base fibers for conductive fibers are polyester and polyamide, including PA-66. The conductive fibers may be metal-coated fibers or filaments, carbon fibers, metallic fibers, or the like.

In an embodiment of the invention, the conductive fiber may make up from about 1% to about 9% of the total weight of the fabric. In another embodiment, the fabric may be about 3% to about 6% conductive fiber and the remainder of the fibers a combination of non-conductive fibers. The fabric may have predetermined spacing and weight percent of conductive thread as described. The predetermined amount of conductive fibers or threads in the conductive fabric may be chosen to optimize the fabric cost and/or properties. One reason one might limit the amount of conductive thread when adding it to an existing fabric construction used in belts is to minimize potential negative impact on the load capacity or durability or other property of the product. The fabric could be made entirely of conductive threads, however, this would likely make the cost prohibitive and is unnecessary to achieve the static conductivity levels described herein.

As an alternative to a conductive fabric such as FIG. 4, any suitable non-conductive fabric may be made conductive by applying one or more suitable conductive coating or treatment, such as a conductive RFL dip, or a conductive rubber cement, or a conductive rubber skim or friction layer or other conductive coating(s) which impregnates the fabric and provides continuity across the fabric. The RFL, rubber cement, or other coating may be made conductive by use of conductive additives such as conductive carbon black, graphite, metal particles or fiber, or carbon fiber, including for example carbon nanotubes, and the like.

The outer layer may be a conductive thermoplastic film which may be laminated to the fabric. Examples of suitable materials include polyethylene, polypropylene, nylons, polyesters, including copolymers, blends, and the like. The thermoplastic film may be made conductive by addition of conductive additives such as conductive carbon black, graphite, metal particles or fiber, carbon fiber including for example carbon nanotubes, and the like. A preferred thermoplastic film is polypropylene with conductive carbon black. The polypropylene film may be polypropylene homopolymer or a polypropylene copolymer. The copolymer may be poly(propylene-ethylene), with predominantly propylene, or less than about 10% ethylene. During a lamination process, the conductive film may be softened or melted and allowed to penetrate somewhat into the conductive fabric to create some mechanical interlocking to ensure electrical continuity with the conductive fabric and for robust mechanical and/or chemical bonding.

The outer layer may alternately be a thermoset film laminated or applied to the fabric. The thermoset may be a rubber composition, a crosslinkable thermoplastic, a polyurethane, epoxy, or the like, which may be made conductive with conductive additives.

The elastomeric body material may be any suitable elastomer composition, including vulcanizable rubber compositions such as nitrile (NBR or HNBR), styrene-butadiene (SBR), chloroprene (CR), ethylene-propylene (EPM or EPDM), rubber blends and the like, or thermoplastic elastomer compositions, or cast polyurethane compositions. The body material may be conductive, but it need not be. For cast polyurethane belts, it is preferred that the fabric and cord be untreated, or at least partially open to penetration by the polyurethane formulation during the casting process. This penetration results in good mechanical adhesion (in addition to any chemical bonding present) to bond all the belt components together. For fabrics treated with conductive dips and/or upcoats, it may be more difficult to obtain good adhesion between all the components and there may be only chemical adhesion to rely on.

Any suitable method of manufacturing the belt may be used. Cast polyurethane timing belts may be made for example as described in U.S. Pat. Nos. 5,231,159, 5,807,194, and 6,964,626, the contents of which are incorporated herein by reference. In this method, the conductive outer layer may be laminated to the conductive fabric to make a conductive jacket. The jacket may be placed around a grooved mold and the carbon tensile cord helically wound onto the jacket. The mold may be placed in a shell and the cavity filled with the urethane materials, allowing them to penetrate the cord and fabric before curing. The cured belt slab may be cut into individual belts. The contact between the fabric and tensile cord established during belt building is thus maintained in the final belts.

Vulcanized rubber belts may be made for example as described in U.S. Pat. No. 6,695,733, and/or the patents referred to therein, the contents of which are incorporated herein by reference. Because of the high viscosity of rubber compositions, the fabric and tensile cord are generally pretreated with various dips or rubber cements. Preferably the treatments are conductive materials so that the continuity between surface and tensile cord is maintained. The conductive outer layer may be laminated to the fabric before treatment with a conductive coating or dip or thereafter. If the dip treatment(s) are suitably conductive, the fabric may not need conductive threads. Lamination may include a suitable adhesive.

Long-length thermoplastic belting may be made for example as described in U.S. Pat. No. 8,668,799, the contents of which are incorporated herein by reference. Belting may be cut into desired lengths and the ends joined to make endless belts. The belting can be made conductive by establishing electrical continuity from the outer surface material to the conductive tensile cord as described herein.

Figure 5:
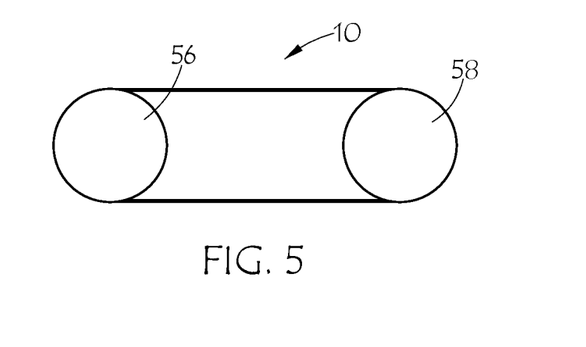
FIG. 5 is a schematic representation of a belt drive layout used to test belt durability.
Figure 6:
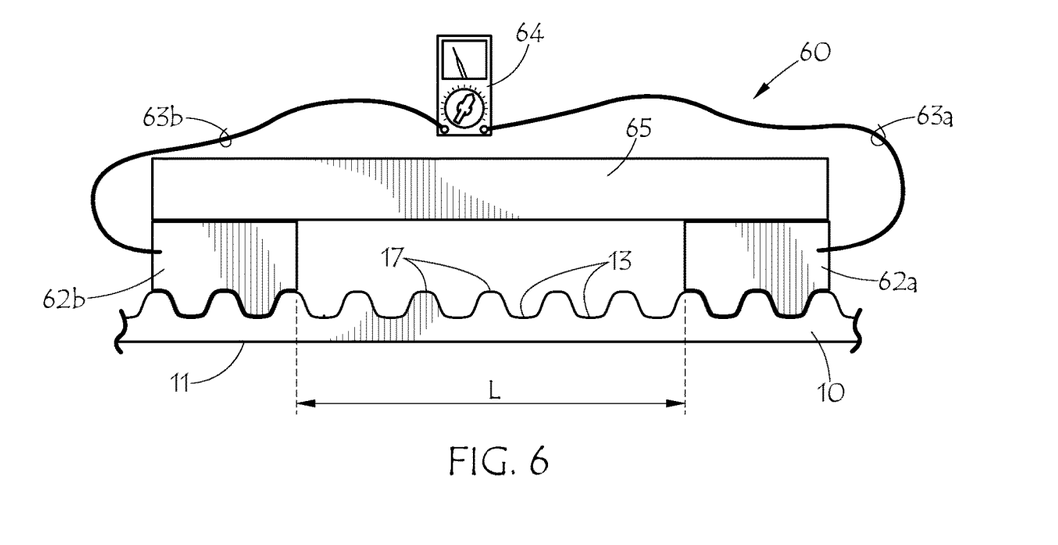
FIG. 6 is a schematic representation of a belt conductivity test.

In the following examples, inventive examples are indicated as "Ex." and comparative examples are "Comp. Ex." Belts were placed on the durability test drive shown schematically in FIG. 5. The durability test is shown with belt 10 trained about 24-groove pulleys 56 and 58, which are driven at 2000 RPM with a predetermined load and tension, at room temperature. The tension and HP chosen leads to a tension ratio, $T_1/T_2$ (tight side over slack side tension). Belts were tested for electrical resistance using the resistance apparatus 60 shown schematically in FIG. 6 which is based on ISO 9563:1990(E), 1$^{st}$ Edition, Aug. 15, 1990, (hereinafter "ISO 9563"). In FIG. 6, the resistance of belt 10 is measured by placing two contacts 62a, 62b on the tooth side of the belt. The contacts are profiled so that they each cover three teeth 17 and two lands 13 of the belt. Two leads 63a, 63b connect the electrodes to insulation test meter 64. The spacer handle 65 holds the two contacts apart a distance L, which is set to provide six teeth 17 and seven lands 13 between the contacts. ISO 9563 calls for use of a conductive fluid between belt and electrode and support of the belt backside 11 on a rigid insulating surface without stress. However, because it was desired to follow the resistance of the belt over the entire life of the belt on the durability test, the test was carried out with the belt on the durability tester of FIG. 5 under tension with the backside 11 over air. It was determined first by experiment that repeatable measurements were indeed possible without a rigid support and without use of the conductive fluid. According to ISO 9563, an antistatic endless synchronous belt, also known as a static conductive (and hereinafter just referred to as a "conductive" belt) must have an electrical resistance, in mega-ohms (MΩ), not exceeding 0.6·L/w where L is the distance shown in FIG. 6, and w is the belt width. Thus, resistance measurements, R, can be normalized for belts of different width and pitch and the requirement for a conductive belt rewritten as Rw/L≤0.6 MΩ.

Figure 7:
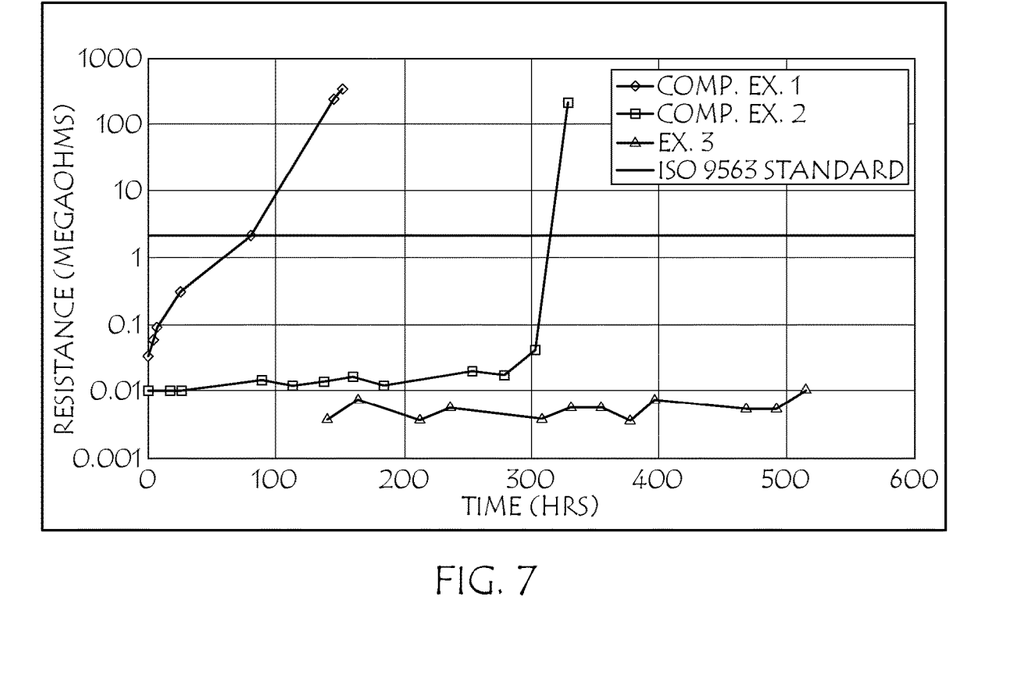

In this first series of examples, three different polyurethane synchronous belt constructions were compared. All three belt constructions were made with cast, non-conductive, polyurethane bodies and have 8-mm tooth pitch, Gates GT® tooth profile, 16-mm width, and 140 teeth. The laminating and urethane casting process described above was used. Comp. Ex. 1 included a non-conductive tensile cord of aramid fibers, a non-conductive nylon fabric and a conductive polyethylene thermoplastic film as the outer layer. Comp. Ex. 2 was built like Comp. Ex. 1 but with a conductive fabric of nylon with a conductive weft thread spaced about every 4 mm among the other non-conductive weft threads. Ex. 3 was built like Comp. Ex. 2 but with conductive carbon fiber tensile cord instead of aramid. Thus, Ex. 3 provides a conductive path from the outer layer to the conductive tensile cord at least in the land region of the belt. These constructions are summarized in Table 1 along with the test results. The belts were run on the durability test at a 10 HP load and tension ratio of 8, with periodic resistance measurements made as shown graphically in FIG. 7. The time at which the resistance exceeded the ISO 9563 maximum for conductive belts (2.1 MΩ) is reported in Table 2 along with the total test time and reason for ending the test. Note that the comparative belts both lost conductivity long before the life of a belt on the test was reached (about 378 hours for aramid cord). The inventive belt never lost conductivity and the test was stopped at 515 hours. The inventive belt needed to be tested at a higher load so the life of the belt would be in a range more practical for limited test resources.

Figure 8:
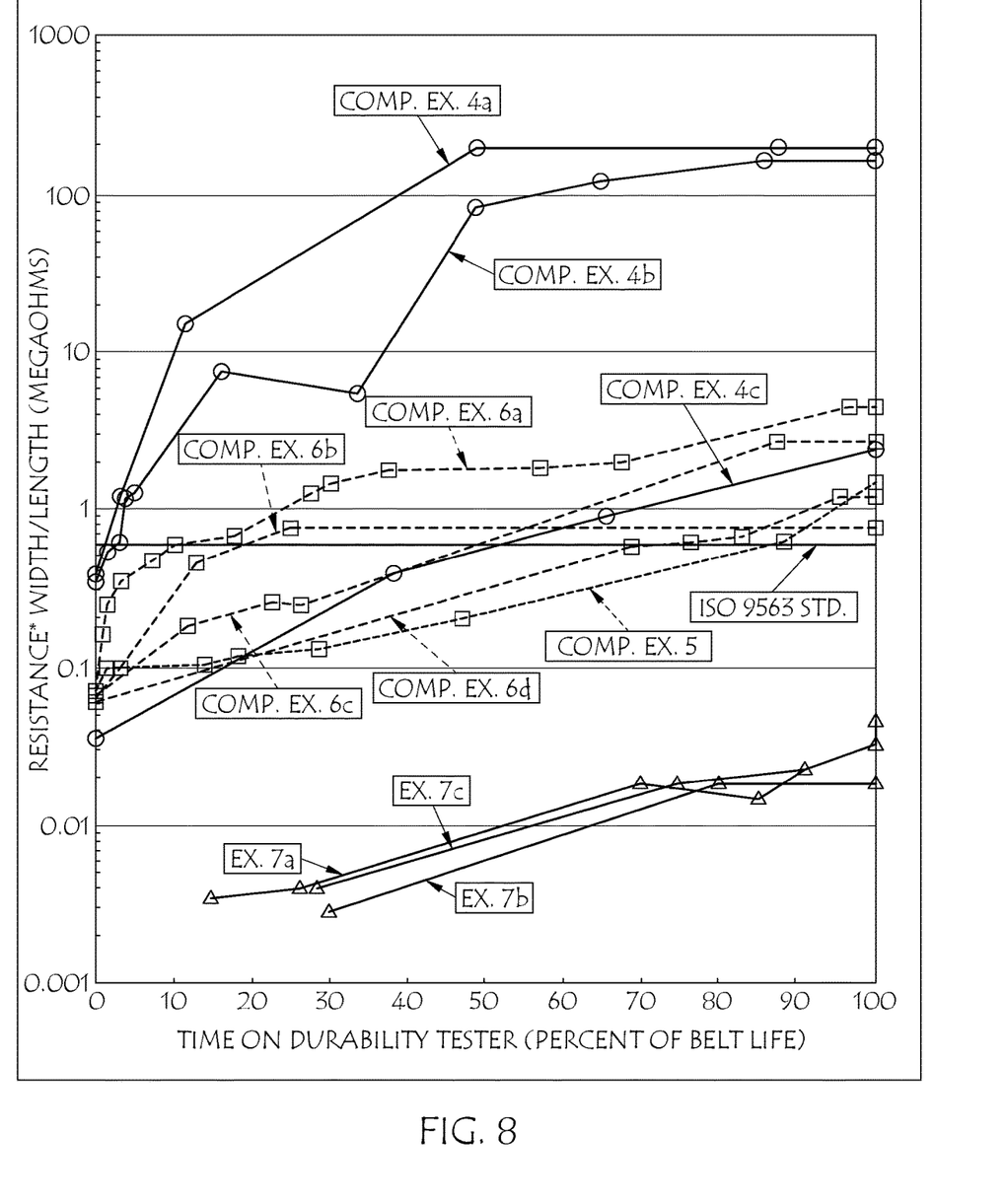
FIG. 8 is a graphical representation of belt electrical resistivity versus percent of belt life for a number of Example and Comparative belts tested on the drive layout of FIG. 5.

In the second series of examples, the inventive belts were durability tested at 19 HP. In addition, various comparative belts currently available in the market and advertised as conductive were durability tested. The inventive examples, being of polyurethane construction, are of much higher load capacity than the comparative rubber belts. Therefore, the test conditions for the rubber belts were chosen to give belt lives in the range of up to about 150 hours. Since the comparative belts had different widths, the normalized resistance, Rw/L, was used for comparing the measurements. The belts and their durability and conductivity results are listed in Table 2. FIG. 8 shows the normalized resistance measurements over the life of the belt versus the percent of the total belt life at the time of measurement. When multiple belts of the same construction were tested, the example number was kept the same and a letter designation used for each repeat.

TABLE 1

|  | Comp. Ex. 1 | Comp. Ex. 2 | Ex. 3 |
| --- | --- | --- | --- |
| tensile cord | aramid fiber | aramid fiber | carbon fiber |
| nylon fabric | non-conductive | conductive | conductive |
| polypropylene outer layer | conductive | conductive | conductive |
| durability test time (hrs) | 149.8 | 378 | 515.9 |
| reason test stopped | loss of conductivity | tensile cord failure | test taking too long never lost conductivity |
| time of conductivity (hrs) | 79 | 303 |  |
| initial resistance (MΩ) | 0.034 | 0.01 | <0.004 |
| final resistance (MΩ) | 332 | 330 | 0.012 |

All the comparative belts in the second series are rubber synchronous belts. Comp. Ex. 4 is a rubber belt made static conductive by use of a conductive dip on the fabric. The fabric itself is made of non-conductive nylon. The conventional rubber may have some level of conductivity, but would be much too high in resistance to meet the ISO 9563 requirements for antistatic belts. In addition, Comp. Ex. 4 has non-conductive fiberglass tensile cord. As shown in FIG. 8, Comp. Ex. 4 meets the ISO 9563 spec initially, before testing begins, but loses conductivity after a just a few hours of testing, presumably due to wearing away or breakup of the conductive dip on the tooth surface. Thus, conductivity is lost long before the end of the useful life of the belt.

Comp. Ex. 5 and 6 have similar constructions, but Comp. ex. 6 is believed to have a conductive backside polyethylene film in addition to that on the tooth side of the belt. These two constructions are believed to be constructed in accordance with the teaching of U.S. Pat. No. 6,770,004. The belts in that patent only had conductivity through the conductive polyethylene surface layer, but were reported to exhibit conductivity for the life of the belt. However, the belts in the '004 patent were only tested on a flex tester, not a loaded test. Flex testing is generally likely to fail the tensile cord before the jacket, and very unlikely to fail from tooth shear. Yet, many if not most applications require the belt to carry some load. Loaded tests may likely fail in tooth shear, jacket wear, and the like. The durability test results on Comp. Ex. 5 and 6 show that the conductivity on loaded tests does not last the life of the belt.

The inventive belts of Ex. 7 include a conductive polypropylene surface on a conductive fabric tooth cover with a carbon fiber conductive tensile member. Ex. 7 belts exhibit electrical continuity between the toothed surface and the tensile member. The inventive belts of Ex. 7 not only have the lowest resistance from the outset of any of the tested belts, but they easily reach the end of the load-life durability test without coming close to losing conductivity. These belts remain conductive even when worn to the point illustrated in FIG. 3.

Thus, a combination of conductive outer layer with conductive fabric and conductive cord, all electrically con- 8. The belt of claim 7 wherein the conductive thread comprises conductive metal-coated fiber.

TABLE 2

|  | Comp. Ex. 4 | | | Comp. Ex. 5 | Comp. Ex. 6 | | | | Ex. 7 | | |
|---|---|---|---|---|---|---|---|---|---|---|---|
| outer layer | conductive dip | | | cond. PE | conductive polyethylene[1] | | | | conductive polypropylene | | |
| fabric | conventional nylon | | | nylon | conventional nylon | | | | conductive nylon | | |
| cord | fiberglass | | | aramid | aramid | | | | carbon fiber | | |
| body | conventional rubber | | | rubber | conventional rubber | | | | cast polyurethane | | |
| Test ID | 4a | 4b | 4c | 5 | 6a | 6b | 6c | 6d | 7a | 7b | 7c |
| width (mm) | 20 | 20 | 16 | 16 | 20 | 20 | 20 | 20 | 16 | 16 | 16 |
| T1/T2 | 8 | 2.5 | 8 | 8 | 8 | 2.5 | 2.5 | 2.8 | 8 | 8 | 8 |
| load (HP) | 11 | 10 | 10 | 10 | 11 | 7.5 | 9 | 9 | 19 | 19 | 19 |
| belt life (hrs) | 35 | 150 | 8.4 | 161 | 241 | 18 | 27 | 22 | 164 | 90 | 153 |
| conductive life (% of belt life) | 1 | 3 | 50 | 86 | 10 | 19 | 35 | 75 | 100 | 100 | 100 |

[1]This belt is believed to also have a conductive PE film on the backside.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A power transmission belt comprising an elastomeric belt body, an electrically conductive tensile cord in a cord layer reinforcing the belt body, an outer layer of electrically conductive thermoplastic film, and an electrically conductive fabric layer residing between the tensile cord layer and the outer layer and providing electrical continuity between the outer layer and the tensile cord.

2. The belt of claim 1 wherein the electrically conductive fabric layer comprises a fabric and a conductive impregnating coating which presents at both surfaces of said fabric and contacts both the outer layer and the tensile cord thereby providing the electrical continuity there between.

3. The belt of claim 2 wherein the elastomeric belt body comprises rubber.

4. The belt of claim 3 wherein the tensile cord comprises carbon fiber.

5. The belt of claim 1 wherein the electrically conductive fabric layer comprises a fabric comprising an electrically conductive thread which presents at both surfaces of said fabric and contacts both the outer layer and the tensile cord thereby providing the electrical continuity there between.

6. The belt of claim 5 wherein the elastomeric belt body comprises rubber.

7. The belt of claim 6 wherein the tensile cord comprises carbon fiber.

8. The belt of claim 7 wherein the conductive thread comprises conductive metal-coated fiber.

9. The belt of claim 8 wherein the metal coating comprises silver.

10. The belt of claim 8 wherein the metal-coated fiber is silver-coated polyamide fiber.

11. The belt of claim 5 wherein the conductive thread is bundled with non-conductive fibers and woven into the fabric with non-conductive threads at a predetermined spacing.

12. The belt of claim 11 wherein the predetermined spacing is in the range from 1 to 10 mm.

13. The belt of claim 12 wherein the fabric has a weft direction and the conductive threads run in the weft direction of the fabric which is oriented substantially in the longitudinal direction of the belt.

14. The belt of claim 5 wherein the conductive thread is wrapped around non-conductive thread and woven into the fabric with other non-conductive threads at a predetermined spacing.

15. The belt of claim 5 wherein the fabric has a weft and the number of conductive threads is about 10% of the total thread count in the weft.

16. The belt of claim 5 wherein the conductive threads make up from about 1% to about 9% of the total fabric weight.

17. The belt of claim 1 wherein the conductive thermoplastic film comprises polyethylene.

18. The belt of claim 1 wherein the conductive thermoplastic film comprises polypropylene.

19. A method of making a conductive power transmission belt comprising: applying to a belt mold an electrically conductive thermoplastic film, an electrically conductive fabric layer, and an electrically conductive tensile cord; wherein the conductive fabric layer resides between and in contact with the film and the tensile cord providing electrical continuity between the film and the tensile cord.

20. The method of claim 19 further comprising introducing a rubber composition to form a belt body and surround at least a portion of said tensile cord.

21. The method of claim 20 wherein said tensile cord comprises carbon fiber.

22. The method of claim 21 wherein the electrically conductive fabric layer comprises a fabric and a conductive impregnating coating which presents at both surfaces of said fabric and contacts both the outer layer and the tensile cord thereby providing the electrical continuity there between.

23. The method of claim 19 wherein said fabric layer comprises an electrically conductive fabric, and wherein said film and said fabric are laminated together before said applying to the belt mold.

* * * * *